United States Patent
Gregorian et al.

(10) Patent No.: US 7,843,859 B1
(45) Date of Patent: Nov. 30, 2010

(54) ANALOG ECHO CANCELLER WITH FILTER BANKS

(75) Inventors: Roubik Gregorian, Saratoga, CA (US); Gaurav Malhotra, Santa Clara, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 83 days.

(21) Appl. No.: 12/236,394

(22) Filed: Sep. 23, 2008

(51) Int. Cl.
*H04B 3/20* (2006.01)
(52) U.S. Cl. .................. 370/290; 370/286; 370/201
(58) Field of Classification Search .............. 370/286, 370/289, 290; 379/3
See application file for complete search history.

(56) References Cited

U.S. PATENT DOCUMENTS

| | | | | |
|---|---|---|---|---|
| 5,148,488 A | * | 9/1992 | Chen et al. | 704/219 |
| 2004/0120272 A1 | * | 6/2004 | Yong-Woon | 370/292 |
| 2006/0133303 A1 | * | 6/2006 | Shida | 370/286 |

* cited by examiner

*Primary Examiner*—Ricky Ngo
*Assistant Examiner*—Iqbal Zaidi
(74) *Attorney, Agent, or Firm*—Stattler-Suh PC

(57) ABSTRACT

A method and system are described for canceling an echo signal in analog domain with adaptive filters working in digital domain. In one embodiment, a system includes an analog-to-digital converter (ADC) sampling at two different phases to generate a first error signal and a second error signal having different phases. The ADC operates at a frequency significantly lower than the frequency at which the individual filters run. The first adaptive filter unit and a second adaptive filter unit are independently trained with the first and second error signals, respectively. The first and second adaptive filter units generate echo estimate signals used to cancel the echo signal.

23 Claims, 16 Drawing Sheets

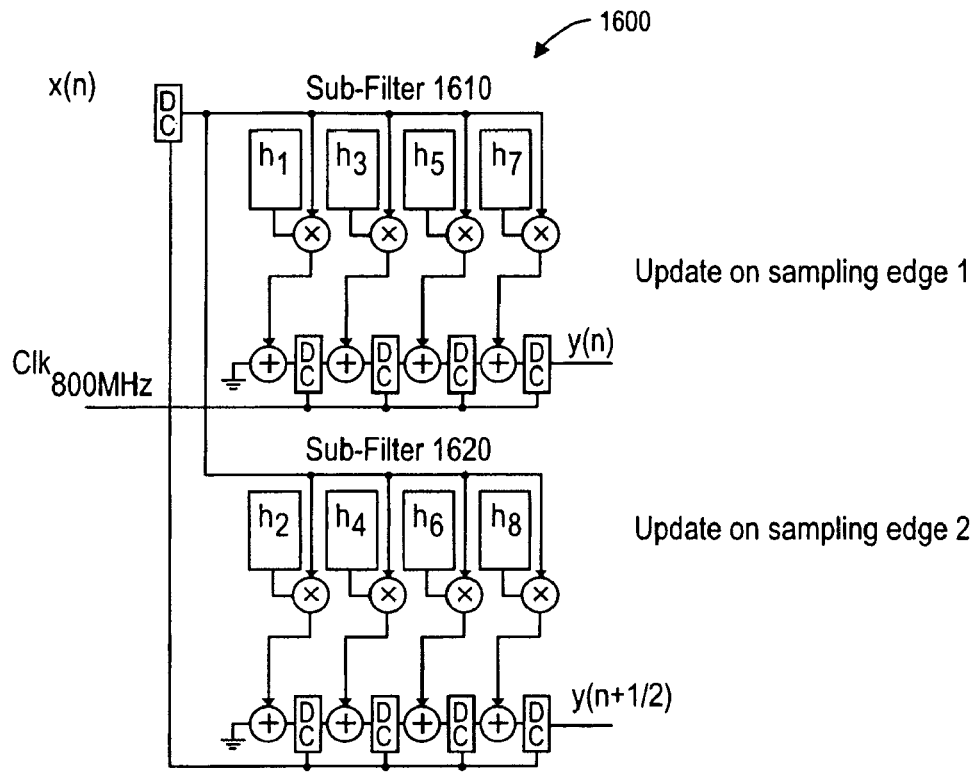
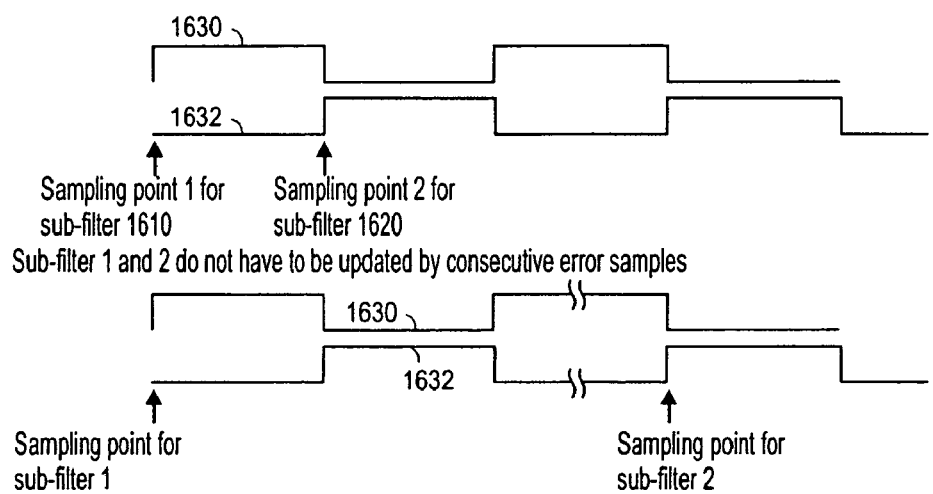
FIG. 16

ANALOG ECHO CANCELLER WITH FILTER BANKS

TECHNICAL FIELD

Embodiments of the invention relate to the field of signal processing and cancelling echo signals.

BACKGROUND

Digital signal processing is widely used to process data carrying signals to remove, for example, inter-symbol interference (ISI), echoes, cross talk and other impairments, and to provide filtering, correlation and other processing. Echo cancellation involves first recognizing the originally transmitted signal that re-appears, with some delay, in the transmitted plus received signal. Once the echo is recognized, it can be removed by 'subtracting' it from the transmitted plus received signal. This technique is generally implemented using a digital signal processor (DSP), but can also be implemented in software. Echo cancellation is done using either echo suppressors or echo cancellers, or in some cases both. In a full duplex data communication system having a single pair of wires, transmit and receive signals share the same channel bandwidth and their spectrums overlap. The signal that is applied to the receiver contains an attenuated and impaired version of the transmitted signal from the remote end plus a portion of the local transmit signal. In such a system an echo canceller is needed before the receiver can process the receive signal to recover the data. One implementation of a conventional echo canceller (EC) is shown in FIG. 1. The echo canceller accepts as input a composite signal (TX+RX) which is comprised of the "wanted" receive and "unwanted" local transmitted signals. The purpose of the echo canceller is to filter out the unwanted local transmitted component and deliver to the system the receive component for further processing. It accomplishes this task by first recognizing and then estimating a replica of the transmitted signal and subsequently subtracting it from the composite signal hence recovering the receive component.

In a DSP based system, the transmitter and echo canceller both operate at sample rate $F_s$ where the sampling period $T_s$ is $1/F_s$. The echo canceller is an adaptive transversal filter that accepts as input, samples of the local transmit signal. Each sample period $T_s$, the echo canceller computes one echo sample and delivers it to a digital-to-analog converter (DAC) which in turn converts it to an analog signal and subtracts it from the composite signal. The signal at the output of the subtracter is the receive signal which also serves as the error signal for the echo canceller. The analog receive signal (error signal) is fed into an analog-to-digital converter (ADC) which is sampled at the same rate $F_s$ and converted to a digital format. The digital signal is fed into the DSP block for further processing of the receive signal. The same signal serves as an error signal and is also fed into the coefficient update block of the echo canceller. This block updates the coefficients of the adaptive filter using a least mean square (LMS) algorithm in such a way that it minimizes the correlation (resemblance) between the receive (error) and transmitted signals. The combination of the transversal filter and the LMS coefficient update blocks form the echo canceller.

In an echo canceller such as the one shown in FIG. 1 that operates at a sample rate of $F_s$ the spectral (frequency) components of the echo can only be cancelled in a range limited to $F_s/2$. Beyond this range the echo canceller is not effective.

In addition to the echo canceller not being effective beyond Fs/2, in the process converting the digital input to analog waveform via the DAC it ends up adding some unwanted components beyond Fs/2. Thus, from 0 to Fs/2 the echo canceller cancels echo and beyond Fs/2 the echo canceller aggravates the echo. This addition of unwanted components results in increased distortion and jitter due to extra high frequency components added by the DAC beyond Fs/2.ADC

SUMMARY

A method and system are described for canceling echo signal in an analog domain beyond the sampling frequency of the main receiver with an echo canceller having taps in a digital domain and output in the analog domain. In one embodiment, a system includes an analog-to-digital converter (ADC) to generate a first error signal and a second error signal having different phases. The ADC has low resolution and operates at a sampling frequency significantly lower than the sampling frequency or clocking frequency of the system. The first error signal independently trains a first adaptive filter unit and the second error signal independently trains a second adaptive filter unit. The first and second adaptive filter units generate echo estimate signals corresponding to different phases of an incoming echo. The outputs of the two filters are combined to produce an estimate of the incoming echo which is used to cancel the echo signal.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 16 illustrates a poly phase implementation of filter banks in accordance with one embodiment.

DETAILED DESCRIPTION

A method and system are described for canceling an echo signal with an adaptive echo canceller. In one embodiment, this occurs in the analog domain. In one embodiment, a system includes an ADC to generate a first error signal and a second error signal having different phases. The system includes a first least mean square (LMS) unit, coupled to the ADC, to receive the first error signal and to generate a first set of tap coefficients. The system includes a first adaptive filter unit, coupled to the first LMS unit, to receive the first output out of the first filter coefficients and to generate a first digital echo estimate signal. The system also includes a second least mean square (LMS) unit, coupled to the ADC, to receive the second error signal and to generate a second set of tap coefficients. The system also includes a second adaptive filter unit, coupled to the second LMS unit, to receive the second output of the second filter coefficients and to generate a second digital echo estimate signal. The first and second adaptive filter units are independently trained with the first and second error signal, respectively. The two error signals correspond to two different phases of the incoming signal, thus can produce an accurate estimate of an incoming echo signal up to twice the frequency of the adaptive filter units. A key feature of this innovation is that the ADC supplying error signals to the adaptive filter unit can be run at a much lower clocking frequency than the adaptive filter units. This concept can be easily extended to a scheme with more than two adaptive filter units by having the error ADC generate errors for more phases.

The system also includes a multiplexer coupled to the first and second adaptive filter units. The multiplexer receives the first and second digital echo estimate signals each having a first clocking frequency and combines these signals into a third digital echo estimate signal having a second clocking frequency. A DAC converts the multiplexer output digital echo estimate signal into an analog echo estimate signal. A subtractor unit subtracts the analog echo estimate signal from the incoming signal having the echo signal. The subtractor unit generates an analog signal with substantially no echo signal up to a certain frequency. An ADC is coupled to the subtractor unit and receives the analog signal from the subtractor unit. The ADC generates a digital signal sent to a DSP unit.

In the following description, numerous specific details are set forth, such as specific frequencies, in order to provide a thorough understanding of the present invention. It will be apparent to one skilled in the art, that the present invention may be practiced without these specific details. In other instances, well-known circuit elements, such as amplifiers and multipliers, are not described in detail in order to not unnecessarily obscure the present embodiments.

Figure 1:
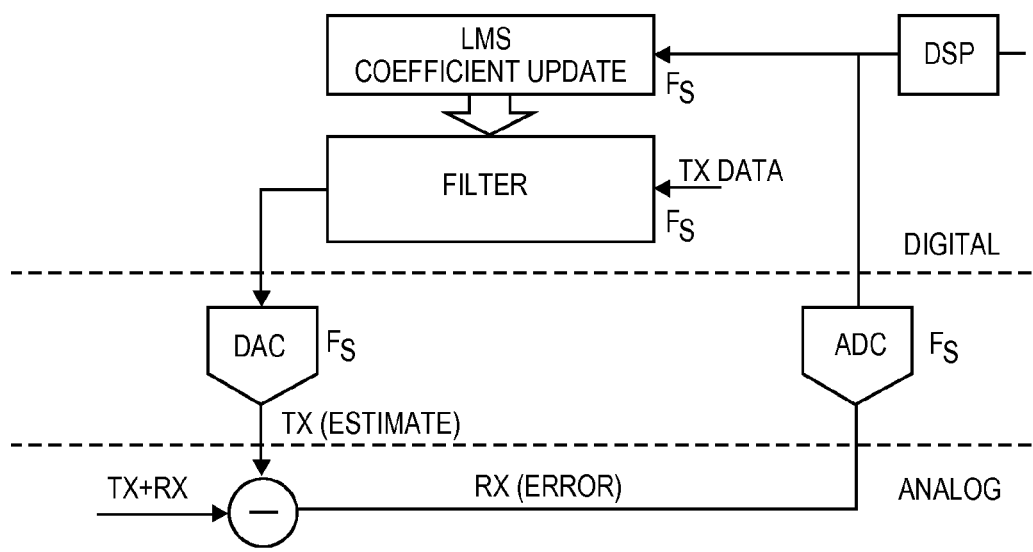
FIG. 1 illustrates a conventional circuit for canceling an echo signal.
Figure 2:
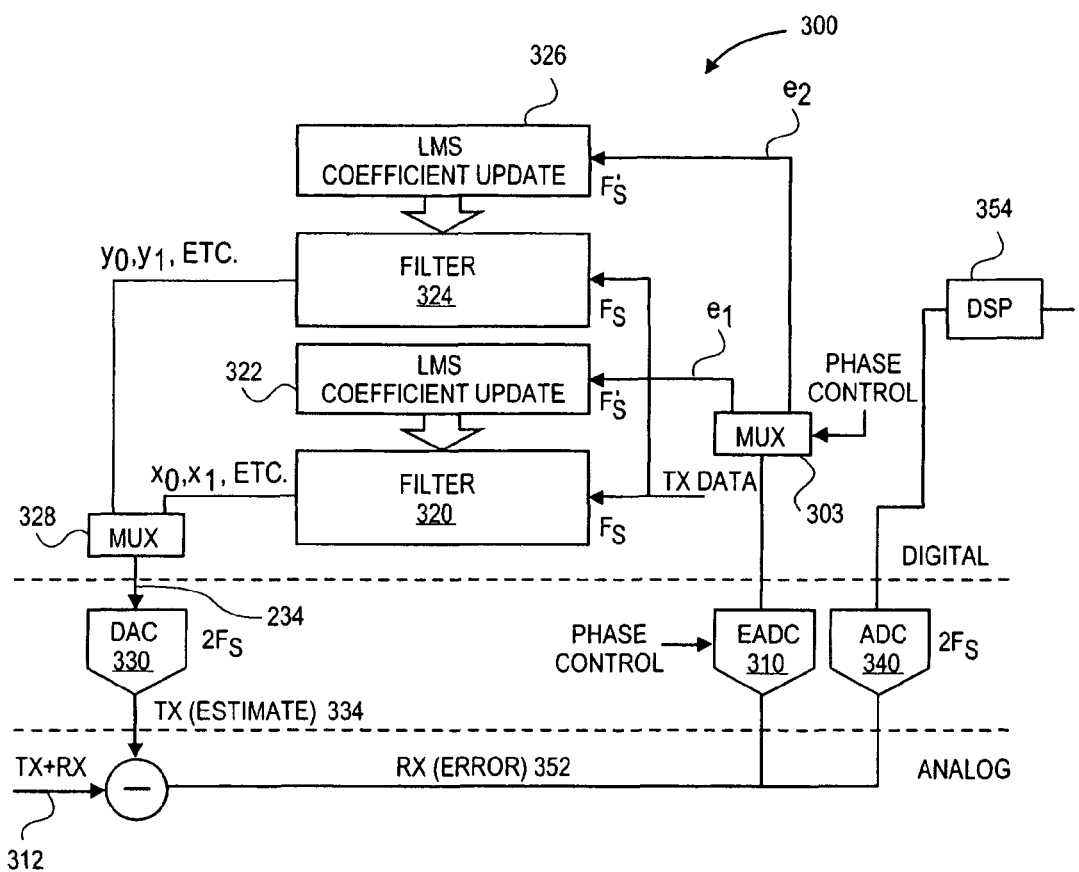
FIG. 2 illustrates a circuit for canceling an echo signal in an analog domain in accordance with one embodiment.

FIG. 2 illustrates a circuit for canceling an echo signal in an analog domain in accordance with one embodiment. The circuit 300 includes LMS units 322 and 326, a filter bank having filter units 320 and 324, a DAC 330, a subtractor unit 350, an ADC 340, an error ADC 310, and a DSP unit 354. An incoming signal (TX+RX) 312, which includes "wanted" receive and "unwanted" local transmitted signals. The output of the ADC 340 is coupled to a digital signal processing (DSP) unit 354. The signal 352 is received by the input of the ADC 340 and also feed into the error ADC 310, which generates error signals, $e_1$ and $e_2$, by running at a low sampling frequency, Fs'. The error signals are input into a multiplexer 303. The multiplexer 303 couples $e_1$ into the LMS unit 322 and couples $e_2$ into the LMS unit 326. The LMS units 322 and 326 update tap coefficients based on the received error signals. The filter unit 320 receives tap coefficients from the LMS unit 322 and generates a digital echo estimate signal ($x_0$, $x_1$, etc.). The filter unit 324 receives tap coefficients from the LMS unit 326 and generates a digital echo estimate signal ($y_0$, $y_1$, etc.) to cancel the echo. A multiplexer 328 interleaves these digital signals ($x_0$, $y_0$, $x_1$, $y_1$) with the x inputs being received from the filter unit 320 and the y inputs being received from the filter unit 324. The multiplexer 328 sends these digital signals to the echo DAC 330, which converts the digital signals into analog estimate echo signals 334. The signals 334 are added to the incoming signal 312 to generate a signal 352 having no echo signal within and outside of a frequency band up to 800 MHz. The signal 352 is sent to ADC 340 which converts this signal into the digital domain before being sent to the DSP unit 354 for the rest of the receiver side signal processing. For the example described above, the DAC 330 may have a clock frequency of approximately twice the clock frequency of the adaptive filters 320 and 324 and the ADC 340. In one embodiment, the adaptive filters and the ADC 340 have a clock or sampling frequency (Fs) of 800 MHz, the DAC has a clock frequency of 1.6 GHz, and the error ADC 310 has a clock frequency (Fs') less than or equal to approximately 200 MHz (e.g., 100 MHz). The error signals can be out of phase by a certain amount such as T/2 of the clock period T (e.g., T/2 may be 1.25 nanoseconds) of the filters in order to independently train each filter with a single ADC operating at a low frequency. The adaptive filters may cancel the echo signal up to 800 MHz. Adding one or more additional adaptive filters will cancel the echo signal up to higher frequencies such as 1200 MHz for a three filter implementation.

In contrast to prior approaches which only cancel up to $F_s/2$, the novel echo canceller illustrated in FIG. 2 has an extended cancellation range of $F_s$ with the sample rate being increased to 2·Fs. This is true even if a lower sample rate of $F_s$ is sufficient for the receiver DSP. Doubling the sample rate imposes an added burden on the implementation and in many cases it may not even be feasible. FIG. 2 shows an example of a more general approach where echo estimates are made at a higher rate while the system 300 still operates at the original rate Fs. In the special case shown in FIG. 2 during one sample period $T_s$, two echo samples are computed and delivered to the DAC 330. In effect while the system still operates at $F_s$, the echo canceller operates at 2·Fs which effectively extends the frequency of the cancellation range to $F_s$.

In this implementation, the echo canceller is constructed of two identical filters and their corresponding coefficient update blocks. Samples of the transmit signal are fed into the two transversal filters 320 and 324 at a rate equal to $F_s$. During each sample period $T_s$, two echo samples are computed and delivered to the DAC 330. The DAC 330 operates at double the sample rate up to 2·Fs and updates its analog output twice during a sample period. Consequently, the effective sample rate of the echo canceller is increased to 2·Fs and the cancellation bandwidth is extended to $F_s$. In this implementation, the roles of the receive signal 352 sent to the ADC 340 and the same signal used as an error signal sent to the EADC 310 are separated. The ADC 340 samples the signal at $F_s$, which is the overall system sample rate. The output of the EADC 310 on the other hand is used to update the coefficients of the adaptive filters. This process is slow and it is not necessary to supply a continuous flow of samples to the coefficient update blocks. As a result of this slower process, the EADC 310 operates in a burst mode and converts the signal 352 by taking samples for a period of time.

Figure 3:
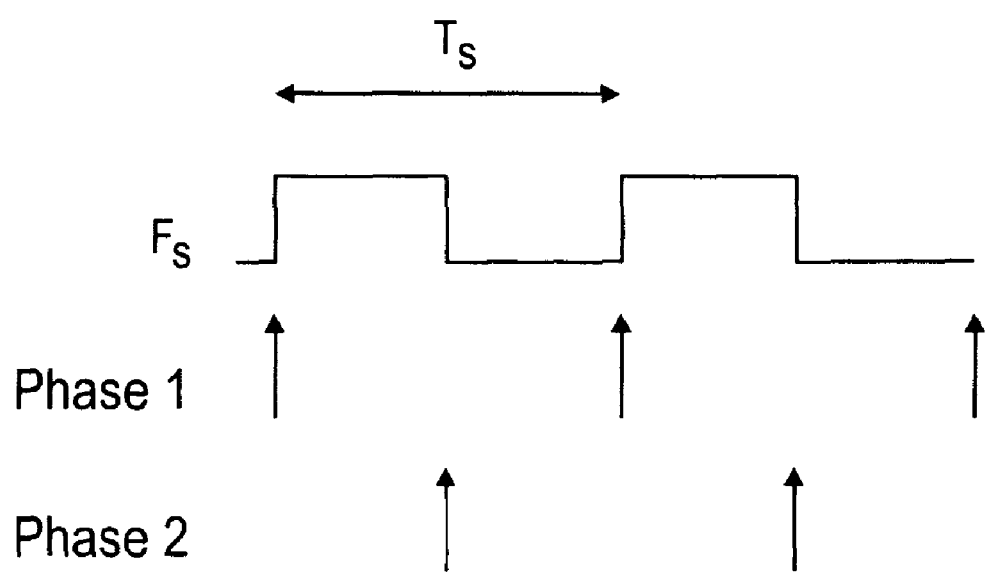
FIG. 3 illustrates a timing diagram for the EADC 310 sampling of the error signal in accordance with one embodiment.

FIG. 3 illustrates a timing diagram for the EADC 310 sampling of the error signal in accordance with one embodiment. The sampling phase alternates between Phase 1 and Phase 2. For a duration of time, the EADC 310 samples the error signal at Phase 1. Then, for a next duration of time, the EADC 310 switches to Phase 2 and then it stops altogether for a period of time. This process repeats for as long as the echo canceller is operational. The error data corresponding to Phase 1 and Phase 2 are used to train the coefficients of filters 320 and filters 324, respectively.

This process trains the two echo canceller filters to compute two echo estimates and cancel the echo at two time instances during one sample period $T_s$, which corresponds to an effective sample rate of 2·Fs. This concept can further be extended so that echo estimates are computed at N time instances during a sample period $T_s$.

Figure 4:
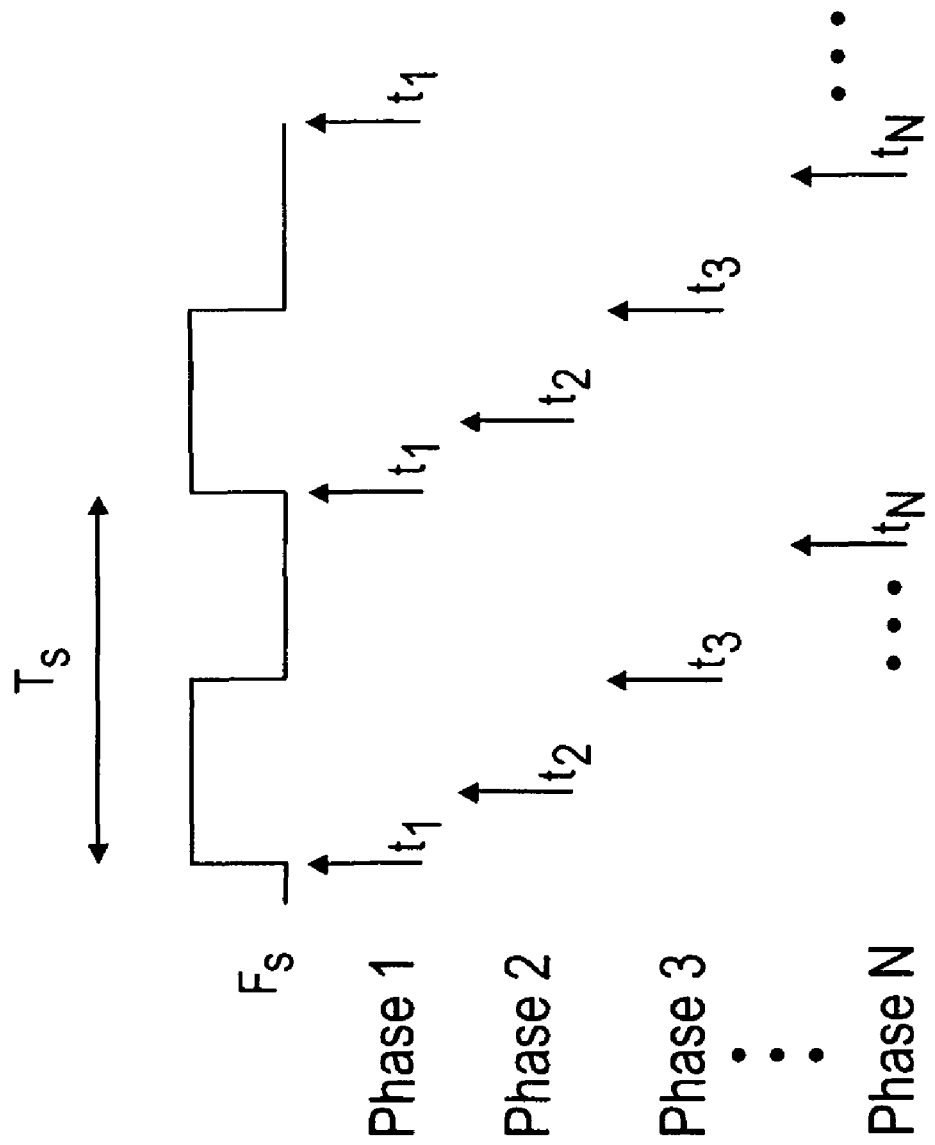
FIG. 4 illustrates a timing diagram for the EADC 310 sampling of the error signal in accordance with another embodiment.

FIG. 4 illustrates a timing diagram for the EADC 310 sampling of the error signal in accordance with another embodiment. The sample period is divided into N time instances. The time instances can be distributed evenly or unevenly during the sampling period. The EADC 310 under the command of the Phase Control samples the error signal at the predetermined time instances $t_1$-$t_N$. Each error signal is delivered to the respective coefficient update block and is used to train the corresponding adaptive filter, which in turn computes an echo estimate signal. The echo estimate signals are supplied to the DAC 330, which under the command of the same Phase Control signal, converts the samples back to analog. The estimated echo signal is subtracted from the incoming composite signal 312 at the respective phase instance when the error sample was taken. This process results in cancelling the echo at N time instances within a sample period and offers an effective echo canceller sample rate of N·$F_s$. Since the output of EADC 310 is merely used to update the echo canceller coefficients, its resolution and accuracy is not very critical and can be much lower than that of the receive ADC 340.

Figure 5:
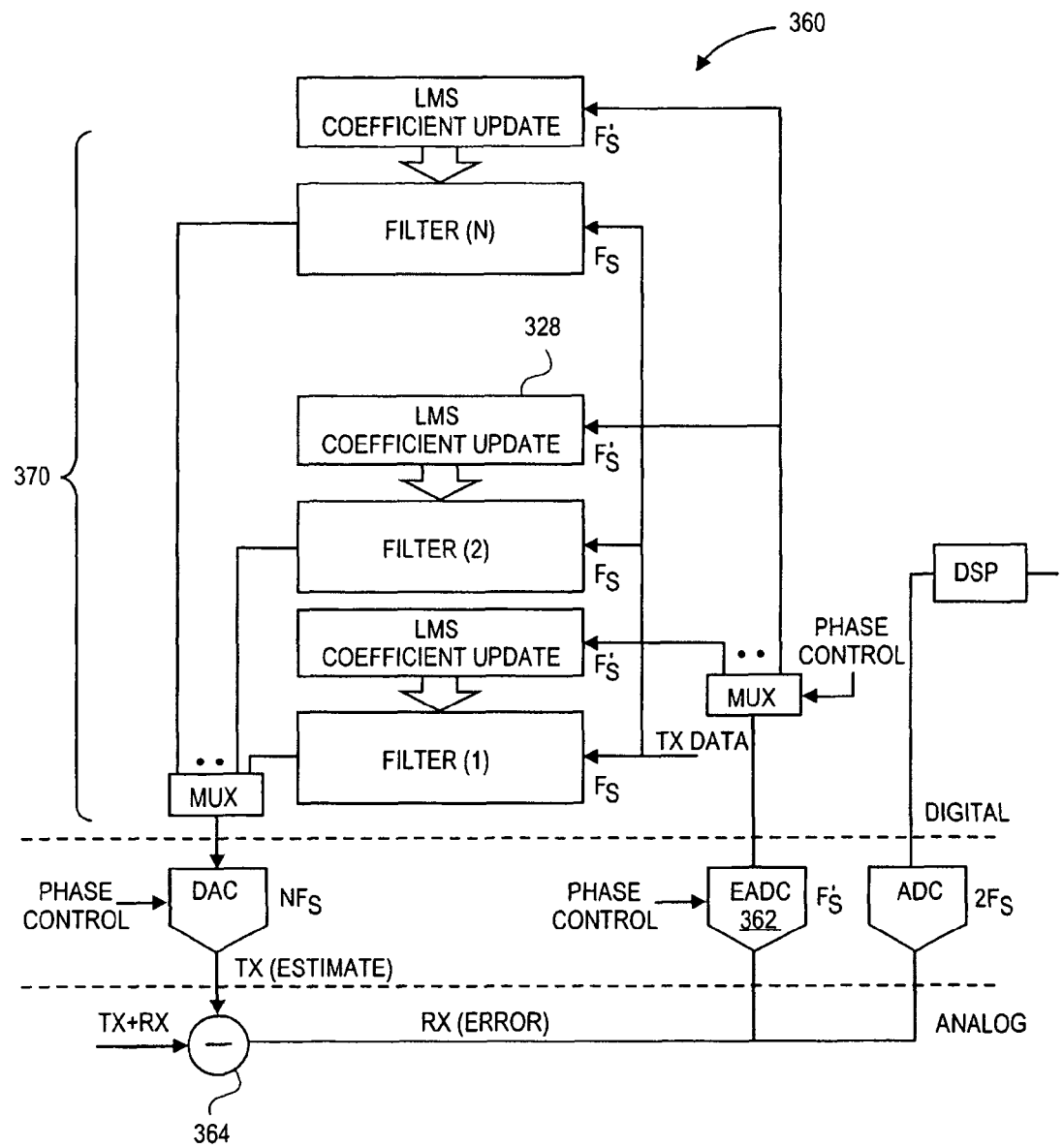
FIG. 5 illustrates a circuit for canceling an echo signal in an analog domain in accordance with one embodiment.

FIG. 5 illustrates a circuit for canceling an echo signal in an analog domain in accordance with another embodiment. The circuit 360 includes a filter bank 370 with N filters and associated LMS units. The circuit 360 includes similar components as described in conjunction with FIG. 2. The EADC 362 receives the error signal from the subtractor and generates N digital error signals for independently training each LMS unit and associated adaptive filter. Each filter can be used to cancel a different frequency range of an echo spectrum. The circuit 360 has an echo canceller with an effective sampling rate of N*$F_S$.

Figure 6:
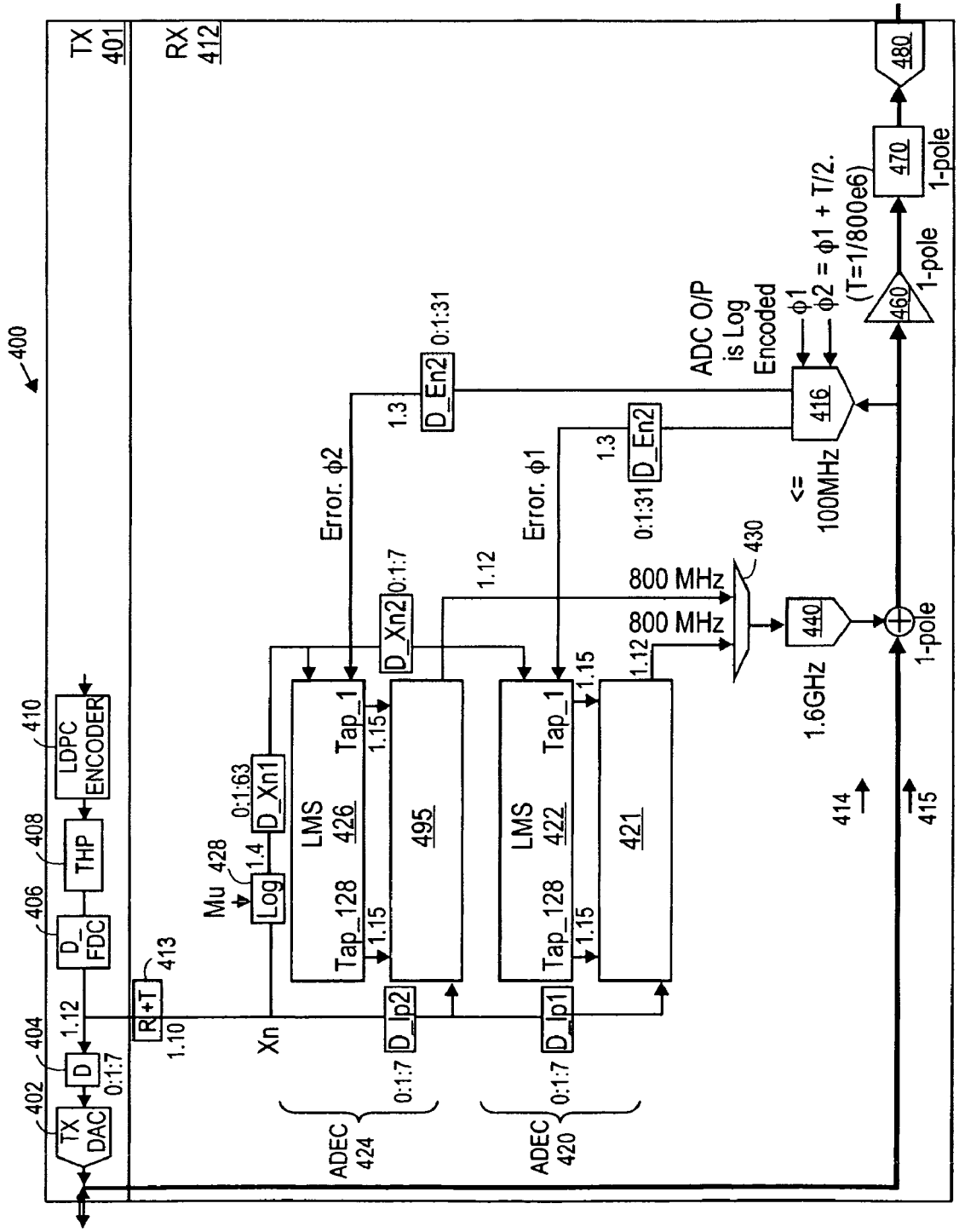
FIG. 6 illustrates a block diagram of an analog signal processing system 400 with an echo canceller in accordance with one embodiment.

FIG. 6 illustrates a block diagram of an analog signal processing system 400 with an echo canceller in accordance with one embodiment. Referring to FIG. 6, the system 400 includes a transmit circuit 401 and receive circuit 412. The transmit circuit 401 includes a transmit DAC 402, a delay block 404, a delay FDC block 406, a THP block 408, and a LDPC encoder 410. The receive circuit 412 includes a R and T block 413, an incoming signal 414, various delay blocks (e.g., D_Ip1, D_Ip2, D_Xn1, D_Xn2, D_En1, D_En2), a subtractor unit 450, a low resolution ADC 416, digitally assisted analog echo canceller (ADEC) 420 and 424, LMS units 422 and 426, a log block 428, a multiplexer 430, a DAC 440, a PGC 460, a boost filter 470, and a main ADC 480.

Signal 414 includes an echo 415 that is generated from the reflectance of signal 414 from other components such as DAC 402. The signal 414 is transmitted through subtractor unit 450 to ADC 416 and also to programmable gain control (PGC) 460, which is coupled to the boost filter 470. The boost filter 470 is coupled to the main ADC 480 which is coupled to a DSP (not shown) for further processing.

The ADC 416 generates error phase signals 1 and 2, which have different phases. In one embodiment, the phase difference is T/2 with T being the inverse of the clocking frequency of the (analog digital echo canceller) ADEC 420 and the ADEC 424. For example, the ADECs may each have a clocking frequency of 800 MHz while the ADC 416 has a clocking frequency less than or equal to 100 MHz. The ADEC 420 includes a coefficient update LMS 422, a forward filter 421, a delay block for input data (D_Xn1), and a delay block (D_Ip1) for input data used in forward filter 421. The ADEC 424 includes a coefficient update LMS 426, a forward filter 495, a delay block for input data (D_Xn2), and a delay block (D_Ip2) for input data used in forward filter 495. The forward filters in combination form a filter bank or array of filters. One or more additional filters may be added to the array.

LMS machines perform least mean square algorithms, and are used in adaptive filters to find the filter coefficients or tap weights that relate to producing the least mean squares of the error signal (e.g., difference between the desired and the actual signal). Although the embodiments herein are described as using LMS algorithms to determine the tap weights of the adaptive filters, alternatively, other algorithms known by those of ordinary skill in the art of ordinary skill in the art can be used.

Figure 7:
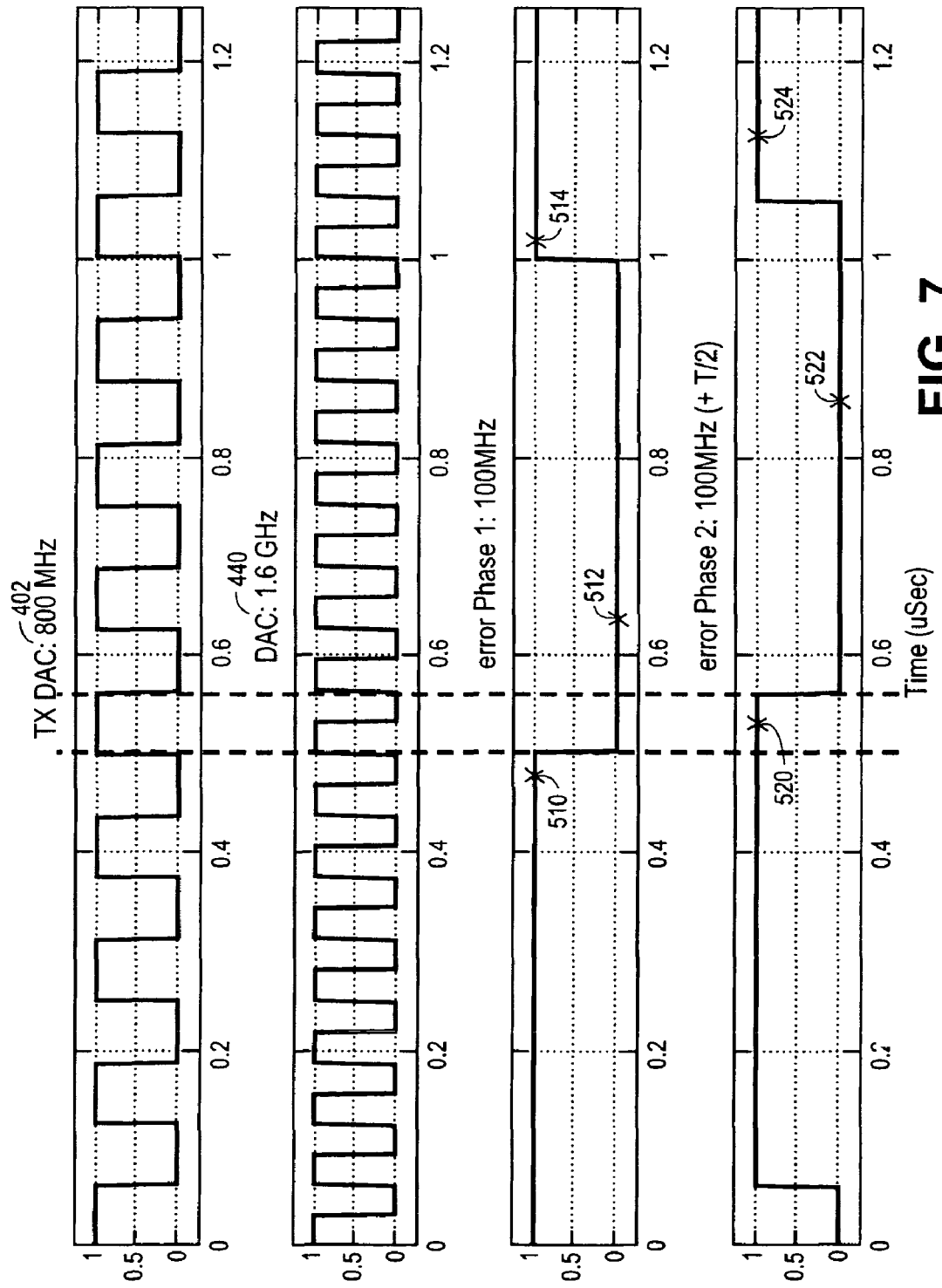
FIG. 7 illustrates an example clocking implementation for the system 400 in accordance with one embodiment.

FIG. 7 illustrates an example clocking implementation for the system 400 in accordance with one embodiment. The adaptive filter units 420 and 495 can have a number of taps such as 128 taps and have their own LMS unit. The adaptive filter unit 420 receives updated tap coefficients from the LMS unit 422 based on the error phase signal 1 when low resolution ADC 416 is sampling using error phase signal 1, which can be 100 MHz as illustrated in FIG. 7. The adaptive filter unit 495 receives updated tap coefficients from the LMS unit 426 based on the error phase signal 2 when low resolution ADC 416 is sampling using error phase signal 2, which can be 100 MHz and shifted by T/2 (e.g., 625 picosecond lag) compared to error phase signal 1. The error points 510, 512, 514 of error signal 1 and the error points 520, 522, 524 of error signal 2 illustrate the sampling of the error ADC 416. These error points correspond to tap coefficients that are used to independently train each adaptive filter unit. The error points may be spaced in time by T/2 with T being the inverse of the clocking frequency of the adaptive filters. In this embodiment, both filter units operate at a clocking frequency of 800 MHz and produce output signals at 800 MHz. The LMS units 422 and 426 operate at a slower frequency (e.g., less than or equal to 200 MHz).

Training each adaptive filter unit to a different phase of error provides taps corresponding to that phase. If errors are spaced a half symbol apart, in effect a T/2 spaced canceller results. The output signals of the filter units are coupled to the multiplexer 430, which combines two 800 MHz data streams, digital echo estimate signals, to form a single 1.6 GHz stream, digital echo estimate signal, by taking samples alternately from each filter unit. FIG. 7 also illustrates the clocking schemes for the transmit DAC 402, which operates at 800 MHz, and the ADC 440, which operates at 1.6 GHz.

The DAC 440 receives the 1.6 GHz digital echo estimate signal and generates an analog echo estimate signal. The subtractor unit 450 subtracts the analog echo estimate signal to the incoming signal 414, which includes an echo signal 415. The subtractor unit 450 generates an analog signal with substantially no echo signal up to a certain frequency such as 800 MHz. The PGC 460 and boost filter 470 send the analog signal to the main ADC 480, which generates digital signals sent to the DSP unit.

In one embodiment, the echo signal 415 is estimated and cancelled up to 400 MHz. In another embodiment, the echo signal 415 is estimated and cancelled up to 800 MHz. In another embodiment, the echo signal 415 is estimated and cancelled up to 1200 MHz, which may require an additional adaptive filter. Advantageously, the ADC 416 is run at a low sampling frequency to independently train both of the adaptive filters, 420 and 495. These adaptive filters generate digital echo estimate signals with no analog or hybrid components. Also, adaptive filters can be trained to cancel echo signals up to 800 Mhz or higher.

Figure 8:
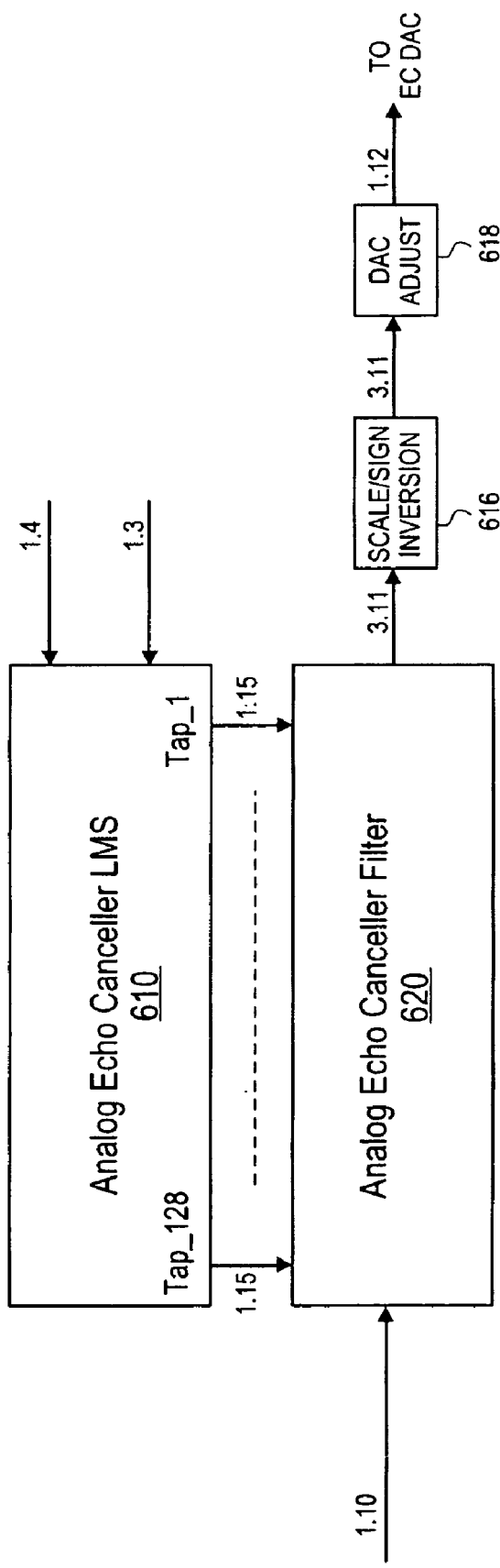
FIG. 8 illustrates a LMS unit coupled to an analog echo canceller filter in accordance with one embodiment.

FIG. 8 illustrates a LMS unit coupled to an analog echo canceller filter in accordance with one embodiment. For the purpose of tap coefficient update, the LMS 610 receives error input signal (1.3) which is log encoded with 4 bits in sign-exponent format. The LMS 610 also receives data input signal (1.4) which is log encoded with 5 bits in sign-exponent format. The LMS 610 generates tap coefficients in the form of 16 bit signals (1.15) that are sent to an analog echo canceller filter 620. This filter 620 also receives 11 bit input signals (1.10). Each filter 620 sends a 14 bit output signal (3.11) to a scaling block 616 with built in programmable sign inversion (output is multiplied by 1 or −1) followed by a DAC adjust block 618. The adjust block 618 generates a 13 bit output signal (1.12). Operations of the scaling block and adjust block are described in more detail below.

Figure 9:
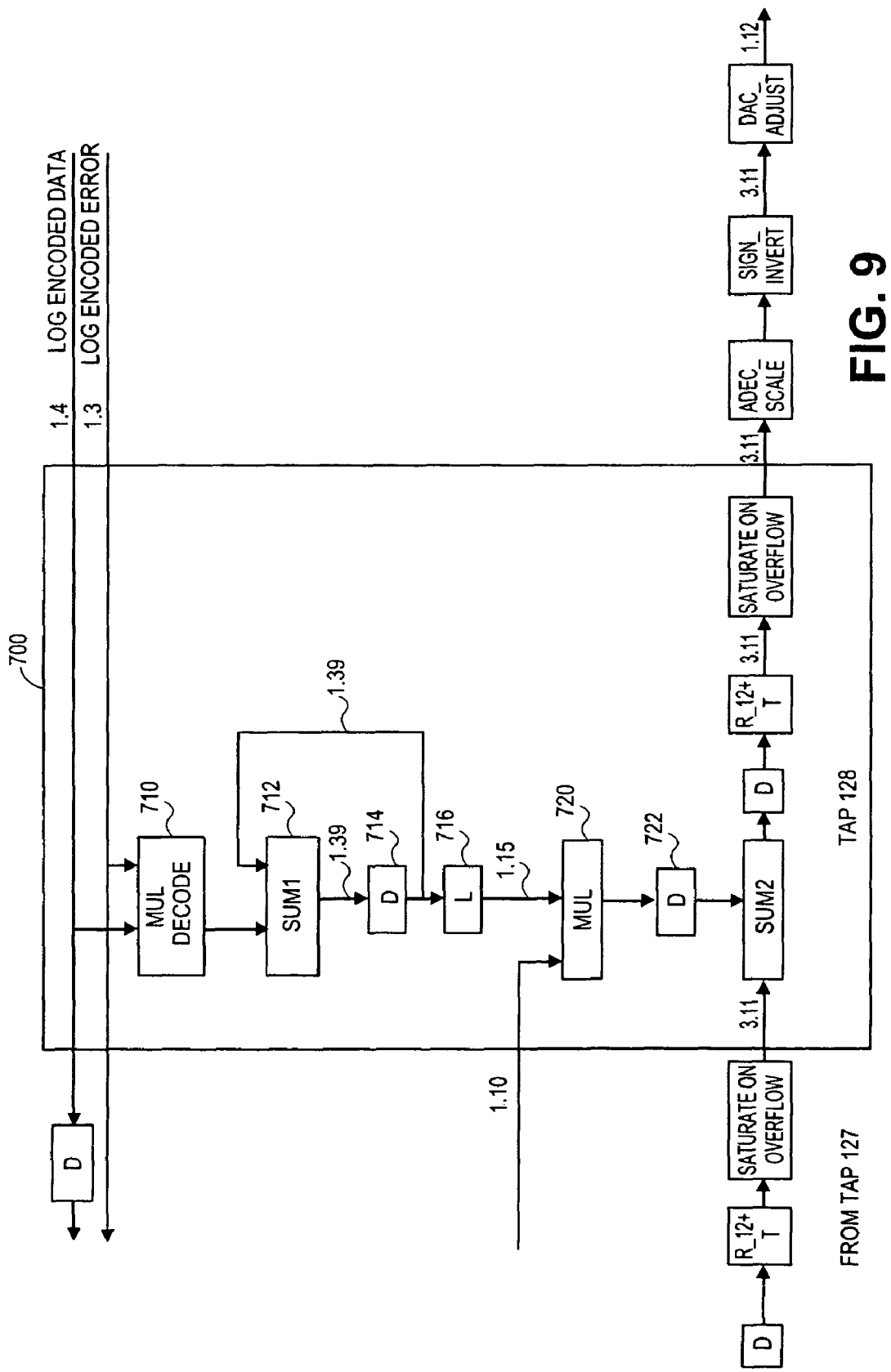
FIG. 9 illustrates a single tap of an analog echo canceller in accordance with one embodiment.

FIG. 9 illustrates a single tap of an analog echo canceller in accordance with one embodiment. The log encoded data signal (1.4) is shifted by a Mu value before being used in a multiplexer decoder 710. In one embodiment, the multiplexer decoder 710 has two inputs, a 5-bit decision log encoded data signal (1.4) and 4-bit log encoded error signal (1.3). An output signal (1.39) of the sum unit 712 is a 40-bit signal in sign extended 2's-complement of the form $+/-2^{-P}$ where P is from 8 to 38 and the value zero. If the data signal (1.4) has a form of decision [0:4], the error signal (1.3) has a form of Error_LE [0:3], the output signal has a form of MULD_OUT [0:39], and M can be the integer represented by Error_LE [1:3]. If P is defined as M+8, then the output is generated as follows:

If Error_LE [0:3] are all zero, then MULD_OUT [0:39] are all set to zero. If MULD_OUT[0]=0 (Positive data), then right shift decision [0:4] by P-bits using sign extension. Then, truncate the shifted values in the format 2.38. Use zero padding at the right and sign extension at the left if needed. If MULD_OUT [0]=1 (Negative data), then form the 2's complement of decision [0:4] and right shift the result by P-bits using sign extension. Truncate the shifted values in the format [1.39]. Use zero padding at the right and sign extension at the left if needed.

The subtractor 712 subtracts the two 40-bit inputs and generates a 40-bit output (1.39) and all are in 2's complement format. There is no overflow protection. The latch 716 (Denoted by L in the figure) stores the 16 (1:15) most significant bits (MSBs) of the 40-bit input (1.39) and the least significant bits (LSBs) are ignored. These 16 bits (1.15) represent the ADEC Tap values that are used in the forward filter output computation.

The multiplexer decoder 720 multiples the 11-bit input data signal (1.10) and the 16-bit LATCH_OUT (Tap value) signal (1.15). The SUM2 takes the 14-bit input (3.11) from the previous tap and the 27-bit (2:25) MUL output to generate the 14-bit number. The SUM2 implements a rounding function by adding a constant ROUND_C (where all but the $12^{th}$ bit to the right of binary point is set to one) and truncating the results to form the output signal.

A data log encoder (not shown) encodes 13 bit input data in 2's complement into 5 bit output signal (1.4) in sign exponent The input data is converted to the form $+/-2^{-M}$ where M is from 0 to 15. The input data value ranges from [−1, 1]. The zero value input is special and encoded as all zero. The encoding process is described as follows. Let the 13-bit input data be represented by b0 to b12 where b0 is the sign bit, b1 is the MSB of the mantissa and b12 is the LSB, that is b0 b1 b2 b3 b4 b5 b6 b7 b8 b9 b10 b11 b12. The output is denoted by d0 d1 d2 d3 d4 where d0=b0 if b0 is 0 (positive data)

d[1:4] represents the location of the first "1" from the left in b[1:11], example if b1=0, b2=0, b3=1 then d[1:4]=0011

If b[1:11] are all zeros, d[1.4] are all set to zero (special zero encoding).

A DAC_Adjust converts input data to output data (same as being fed into TX DAC) by ignoring 2 bits following the sign bit, appending a 0 to the right as follows. This inherently assumes that ADEC output does not overflow beyond [−1,1]. Input [0:13]: d0 d1 d2. d3 d4 d5 d6 d7 d8d d9 d10 d11 d12 d13. Output [0:12]: d0. d3 d4 d5 d6 d7 d8d d9 d10 d11 d12 d13 0

ADEC_Scale is the scaling block for the ADEC filter output. The scaling range is from 7-bit left shift to 8-bit right shift. Default value of ADEC_scale=1, i.e. LEFT shift 1.

A sign inversion output inversion is equivalent to multiplying the output ADEC filter by −1 if desired. An output inversion can be carried out within the scaling block. A default condition for ADEC output is ADEC output: Inversion. [Multiply ADEC o/p by −1]. Thus, by default, ADEC output shall be multiplied by −1.

A Round+Truncate Round+truncate block (denoted by R_n+T) produces output by adding a rounding bit $n^{th}$ bit (to the right of binary point) to the input and truncating the sum as per the defined output. For example, to convert an input 715 to output, add a rounding bit on the $14^{th}$ bit to the right of the binary point as follows:

| Input [0:15] : | c0. | c1 | c2 | c3 | c4 | ... | c13 | c14 | c15 |
|---|---|---|---|---|---|---|---|---|---|
| Round_c: | 0. | 0 | 0 | 0 | 0 | 0 0 0 | | 1 | |
| Sum [0:15]: | S0. | S1 | S2 | | | ... | S13 | S14 | S15 |
| Output [0:13]: | S0. | S1 | S2 | | | ... | S13 | | |

A saturate-on-overflow block provides underflow protection by saturating the output at the maximum positive or negative value respectively.

Mu is the step size for LMS and represents a right shift. It is a 5-bit unsigned integer representing right shifts from 0 to 30. The actual value used for LMS update is given by $2^{-(STEP\_SIZE+8)}$, and hence the values of the step size are from $2^{-8}$ to $2^{-38}$.

In some embodiments, the delays discussed above are defined as follows:

| Delay | Description | Range of values | Default |
|---|---|---|---|
| D_Xn1 | Delay block for input data (Xn in mu *En*Xn). This delay is common to both ADEC 1 & ADEC 2. | 0:1:63 | |

-continued

| Delay | Description | Range of values | Default |
|---|---|---|---|
| D_Xn2 | Delay block for input data (Xn in mu *En*Xn)-only for ADEC 1 | 0:1:7 | 0 |
| D_En1 | Delay block for Error used by ADEC 1 (En n mu*En*Xn). | 0:1:31 | |
| D_En_2 | Delay block for Error used by ADEC 2 (En n mu*En*Xn) | 0:1:31 | |
| D_Ip1 | Delay block for Input data used in forward filter of ADEC 1. | 0:1:7 | 0 |
| D_Ip2 | Delay block for Input data used in forward filter of ADEC 2 | 0:1:7 | 0 |

Notation: 0:1:63 means that the delay value shall be adjustable from 0 (no delay) to 63 in steps of 1.

Referring back to FIG. 6 and the ADC 416, the frequency at which a low resolution ADC is run (rate at which it samples) determines the frequency at which the LMS for an ADEC needs to run. In one embodiment, the ADC 416 runs at 100 MHz in training mode (for a certain period of time defined below), and at some low frequency around 10 MHz in data mode. The two ADEC filters can be updated independently. For example, ADEC 420 updates based on ADC 416 sampling at Clock phase 1 for a certain period of time (defined M below) followed by ADC 416 sampling at Clock phase 1+T/2 for a certain period of time. M and K can be defined as follows:

M (Micro Sec)=ADEC LMS update ON (Either ADEC 420 or ADEC 424 as shown).

K (Micro Sec)=ADEC LMS update OFF (Both ADEC 420 & ADEC 424)

| | Training (100 mSec)* | Rest of training period & Data Mode |
|---|---|---|
| Frequency | <= 100 MHz | 10 MHz |
| M | 1 uSec | 10 uSec |
| K | 0 | 100 uSec |

For exact instance when this 100 mSec interval starts, see training timeline in the startup sequence.

Figure 10:
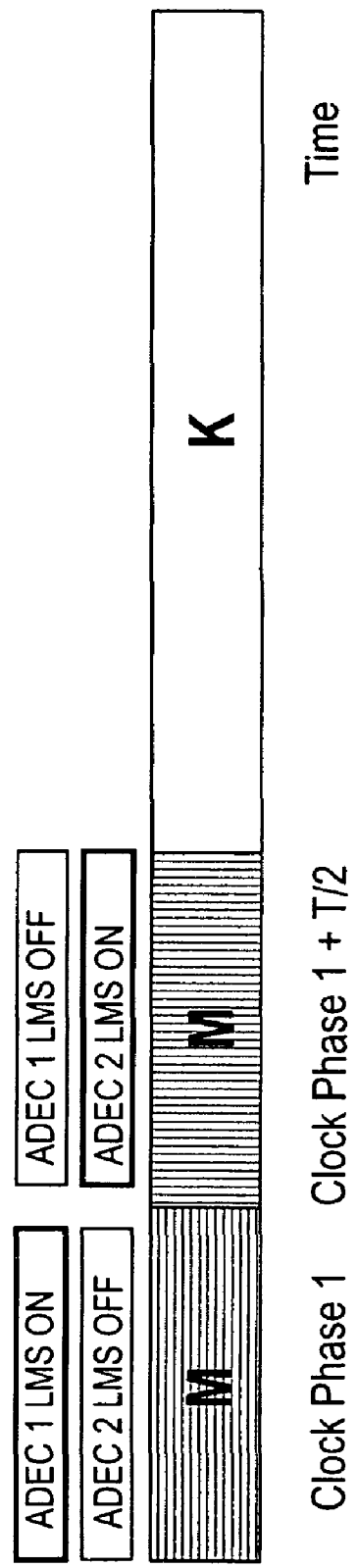
FIG. 10 illustrates a graphically representation of the training period and data mode for the ADEC 420 and 424 during the time periods M and K in accordance with one embodiment.

FIG. 10 illustrates a graphically representation of the training period and data mode for the ADEC 420 and 424 during the time periods M and K in accordance with one embodiment.

Figure 11:
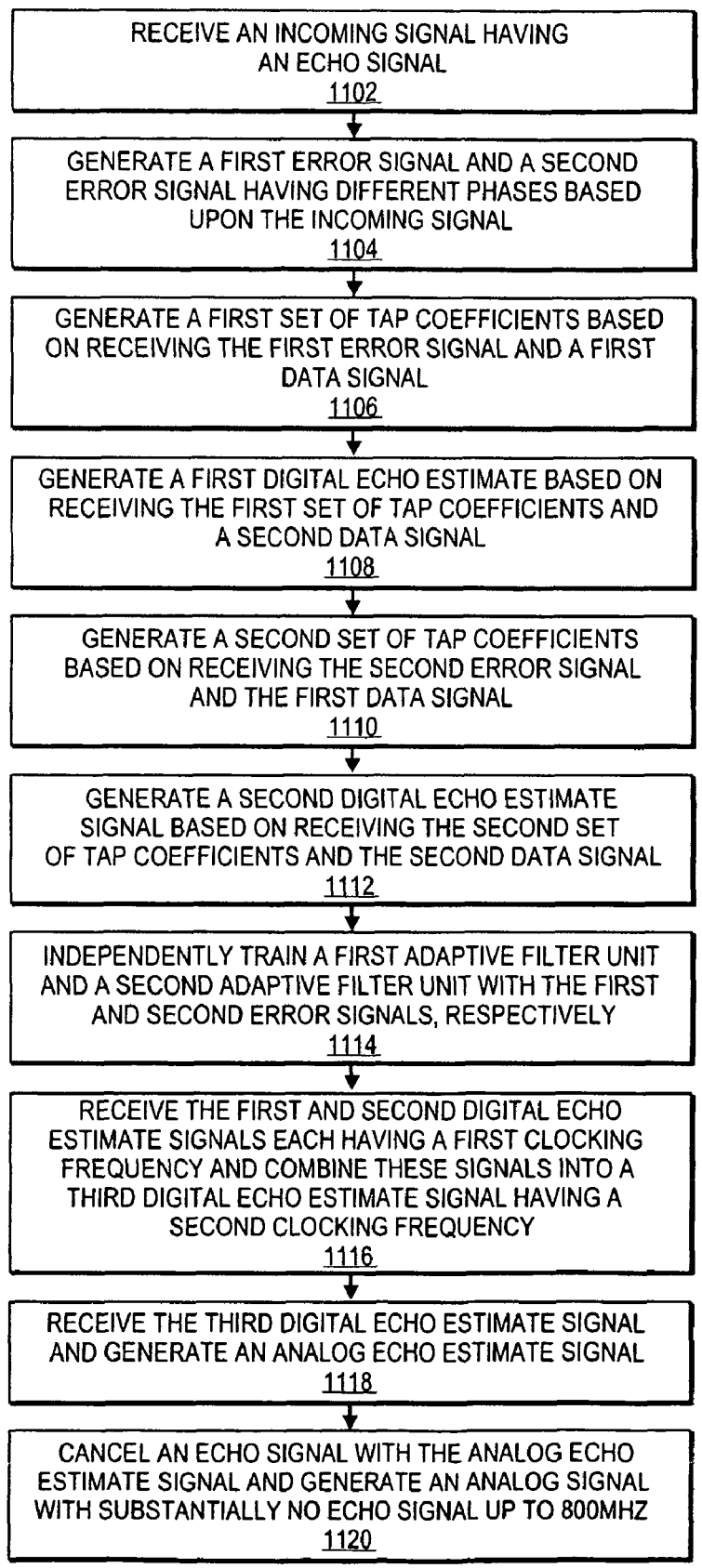
FIG. 11 illustrates a process for canceling an echo signal in accordance with one embodiment.

FIG. 11 illustrates a flowchart which represents a process for canceling an echo signal in accordance with one embodiment. The process includes receiving an incoming signal having an echo signal at processing block 1102. Next, the process includes generating a first error signal and a second error signal having different phases based upon the incoming signal at processing block 1104. Next, the process includes generating a first set of tap coefficients based on receiving the first error signal and a first data signal at processing block 1106. Next, the process includes generating a first digital echo estimate signal based on receiving the first set of tap coefficients and a second data signal at processing block 1108.

Next, the process includes generating a second set of tap coefficients based on receiving the second error signal and the first data signal at processing block 1110. Next, the process includes generating a second digital echo estimate signal based on receiving the second set of tap coefficients and the second data signal at processing block 1112. Next, the process includes independently training a first adaptive filter unit and a second adaptive filter unit with the first and second error signals, respectively, at processing block 1114.

Next, the process includes receiving the first and second digital echo estimate signals each having a first clocking frequency and combining these signals into a third digital echo estimate signal having a second clocking frequency at processing block 1116. In one embodiment, the first clocking frequency is 800 MHz and the second clocking frequency is 1.6 GHz. Next, the process includes receiving the third digital echo estimate signal and generating an analog echo estimate signal at processing block 1118. Finally, the process includes canceling an echo signal with the analog echo estimate signal and generating an analog signal with substantially no echo signal up to 800 MHz at processing block 1120.

Figure 12:
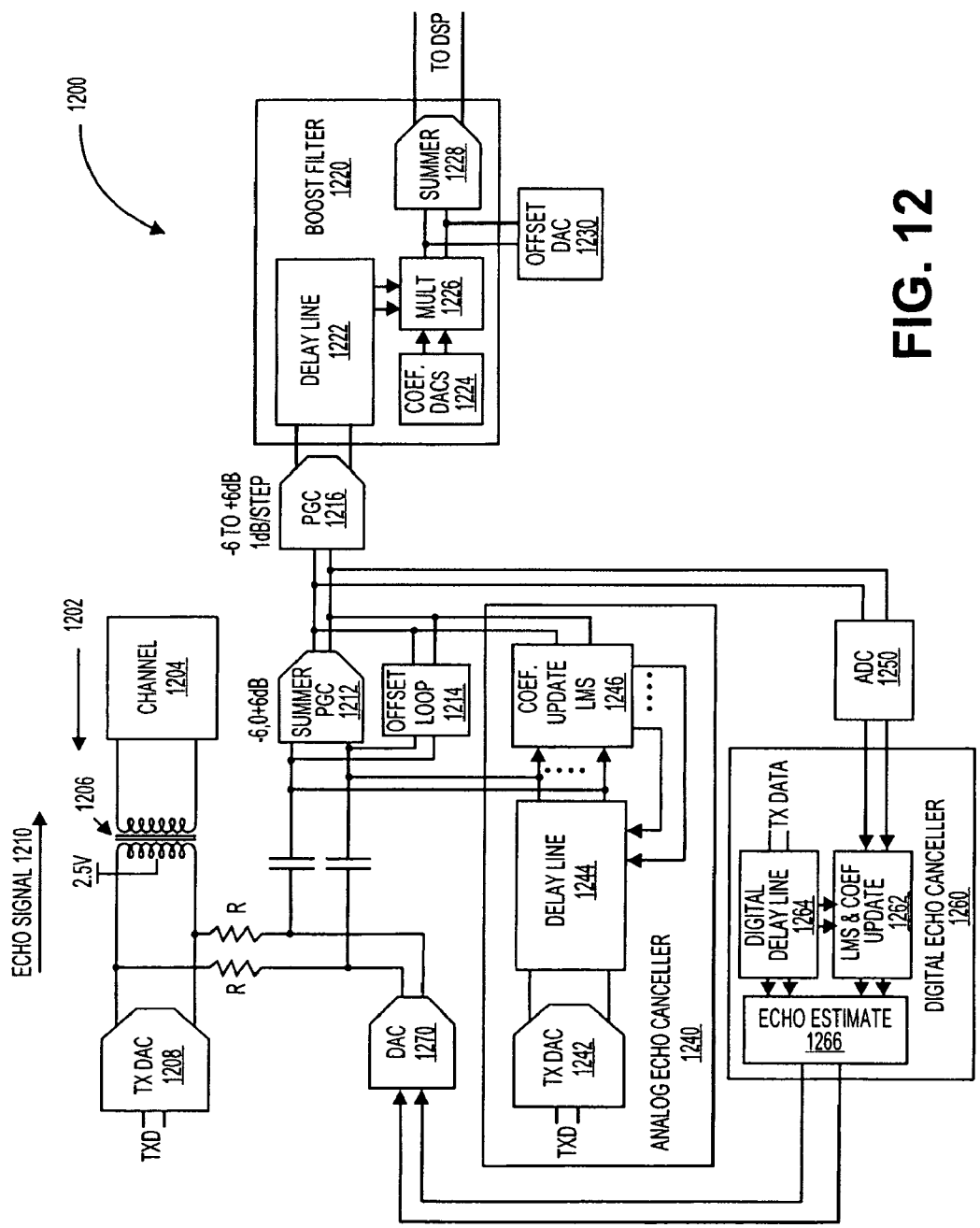
FIG. 12 illustrates a block diagram of an analog signal processing system with an echo canceller in accordance with one embodiment.

FIG. 12 illustrates a block diagram of a transmitter/receiver front end 1200 with an echo canceller in accordance with one embodiment. Referring to FIG. 12, the signal 1202 from channel 1204 (e.g., one or more twisted pairs), which is coupled through transformer 1206 to DAC 408 that generates digital transmit signals. Echo signal 1210 is generated from the reflectance of signal 1202 from other components such as DAC 408. The signals 1202 and 1210 are transmitted through resistors (R) to summer PGC 1212. In one embodiment, these resisters are both 50 ohms. Another resistor may be coupled to the secondary winding of a transformer 1206. The transformer 1206 is a high frequency transformer, for instance in one embodiment, for coupling frequencies in the GHz range.

Summer PGC 1212 is coupled to PGC 1216 which is coupled to the remainder of the analog front end (AFE) including the boost filter 1220. Boost filter 1220 includes a delay line 1222, a coefficient DAC 1224, a multiplexer 1226, and a summer 1228. Note the boost filter 1220 operates in a manner well-known in the art. The boost filter 1220 is coupled to an offset DAC 1230 and a main ADC 1232 which is coupled to a DSP (not shown).

The output signals from the summer PGC 1212 are coupled to the analog echo canceller 1240 and the digital echo canceller 1260. The analog echo canceller 1240 includes a coefficient update LMS 1246, a delay line 1244, interpolating filter and a transmit DAC 1242. The digital echo canceller 1260 includes a coefficient update LMS 1262, a digital delay line 1264, an echo estimate unit 1266 which is coupled to a DAC 1270. The DAC 1270 couples back to the summer PGC 1212.

LMS machines perform least mean square algorithms, and are used in adaptive filters to find the filter coefficients or tap weights that relate to producing the least mean squares of the error signal (e.g., difference between the desired and the actual signal). Although the embodiments herein are described as using LMS algorithms to determine the tap weights of the adaptive filters, alternatively, other algorithms known by those of ordinary skill in the art of ordinary skill in the art can be used.

The echo estimate unit 1266 includes a plurality of filters (e.g., filters 320 and 324 of FIG. 2) that receives updated coefficients from the LMS unit 1262 and samples of transmit signals in order to generate digital echo estimate signals. The echo canceller 1260 operates at a sampling frequency without oversampling the signals received from the LMS 1262. The DAC 1270 receives the digital echo estimate signal and generates an analog echo estimate signal without oversampling.

Summer 1212 adds the analog echo estimate signals to the signals 1202 and 1210. Summer 1212 generates an analog signal with substantially no echo signal in the frequency band of the incoming signal and no additional high frequency component is added outside of the frequency band of the signal 1202. The PGC 1216 and boost filter 1220 send the analog signal to the main ADC 1232, which generates digital signals. These digital signals are sent to the DSP unit for further processing.

Figure 13:
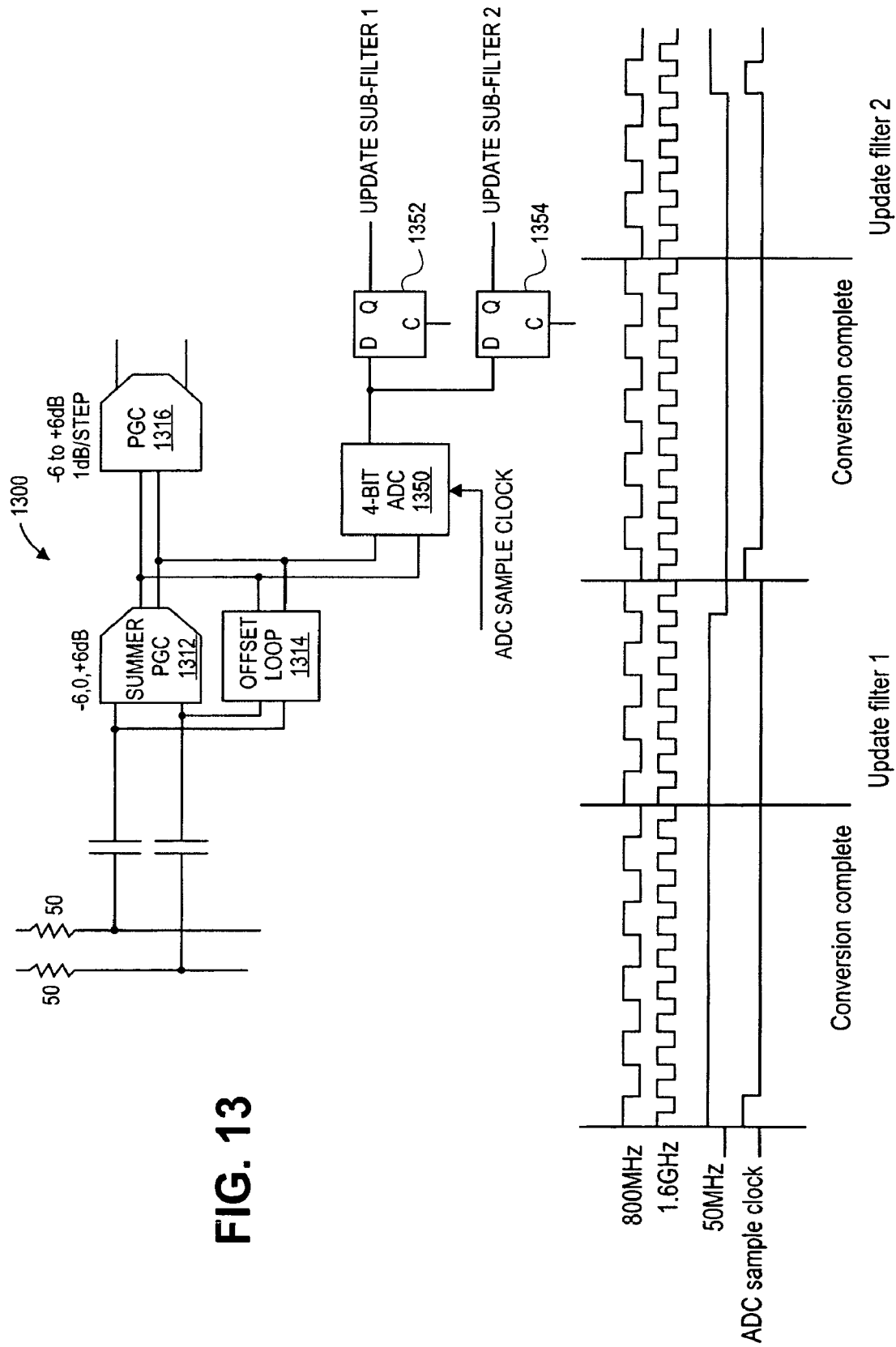
FIG. 13 illustrates an example clocking implementation for an echo canceling system in accordance with one embodiment.

In one embodiment, the main ADC 1232, transmit DAC 1208, and echo estimate unit 1266 operate at a clock frequency of 800 MHz as illustrated in FIG. 13. The Echo DAC 1270 may operate at a clock frequency of 1600 MHz while the error ADC 1250 has a clock frequency of 50 MHz. The digital echo canceller 1260 prevents the DAC 1270 from adding any high frequency component to the echo estimate signal that is designed to cancel the echo signal 1210. The echo signal 1210 is estimated and cancelled up to 1200 MHz. Advantageously, the main ADC 1232 receives input signals with less jitter reducing the jitter sensitivity of the ADC 1232. Also, analog front end (AFE) 1200, has lower voltage levels based on the operations of the novel digital echo canceller 1260 in more effectively canceling the echo signal 1210 without adding additional high frequency components to the echo.

Summer 1212 and PGC 1216 typically control the gain of the received signal so that the amplified signal falls within a predetermined region of the operating characteristics of the circuits receiving the amplified signal. In one embodiment, the PGC gain is set to 0 decibels (dB) and data of the main ADC 1232 is used to set the gain of the summer PGC 1212 before training the digital echo canceller 1260. After the canceller 1260 is trained, the summer 1212 and PGC gain can be accurately set.

The delay lines 1222, 1244, and 1264 illustrated in FIG. 1200 have multiple stages, each of which, in one embodiment, provides equal periods of delay. In an embodiment, each stage has one or more segments, and each segment includes an inductor and a capacitor. This allows for a fractionally spaced equalizer. For the illustrated embodiment, each stage has a single inductor and a single capacitor. Ideally, delay line 1222 is lossless; although as a practical matter, there is some loss associated with each of the stages. In one embodiment, the entire delay line is fabricated from passive elements (inductors and capacitors) without amplification between stages. This reduces the noise that would otherwise occur and build up over the delay line. Ideally, the magnitude at each tap is constant with only the phase of the signal changing.

FIG. 13 illustrates an example clocking implementation for an echo canceling system in accordance with one embodiment. The echo canceling system 1300 includes similar components compared to the front end 1200. The system 1300 includes a summer PGC 1312, a PGC 1316, an offset loop 1314, a 4 bit A/D converter 1350, a latch 1352, and a latch 1354. The latches 1352 and 1354 are part of the LMS 1262 illustrated in FIG. 12. Each sub-filter in echo estimate 1266 is updated in accordance with the clocks of the latches and the A/D converter 1350. In one embodiment, the LMS 1262 uses the following algorithm:

$$C_i(n+1)=C_i(n)+a*x_i(n)*e(n)$$

where e(n) is the error signal generated by the ADC 1350 or error ADC 1250, $C_i(n)$ are coefficients of the LMS 1262, and 'a' is a constant. In one embodiment, the digital echo canceller 1260 and transmit D/A converter 1208 both have a clocking frequency of 800 MHz, the DAC 1270 has a clocking frequency of 1.6 GHz, the A/D converter 1350 has a sample frequency of 100 MHz, and the error A/D converter 1250 has a clocking frequency of 50 MHz.

Figure 14:
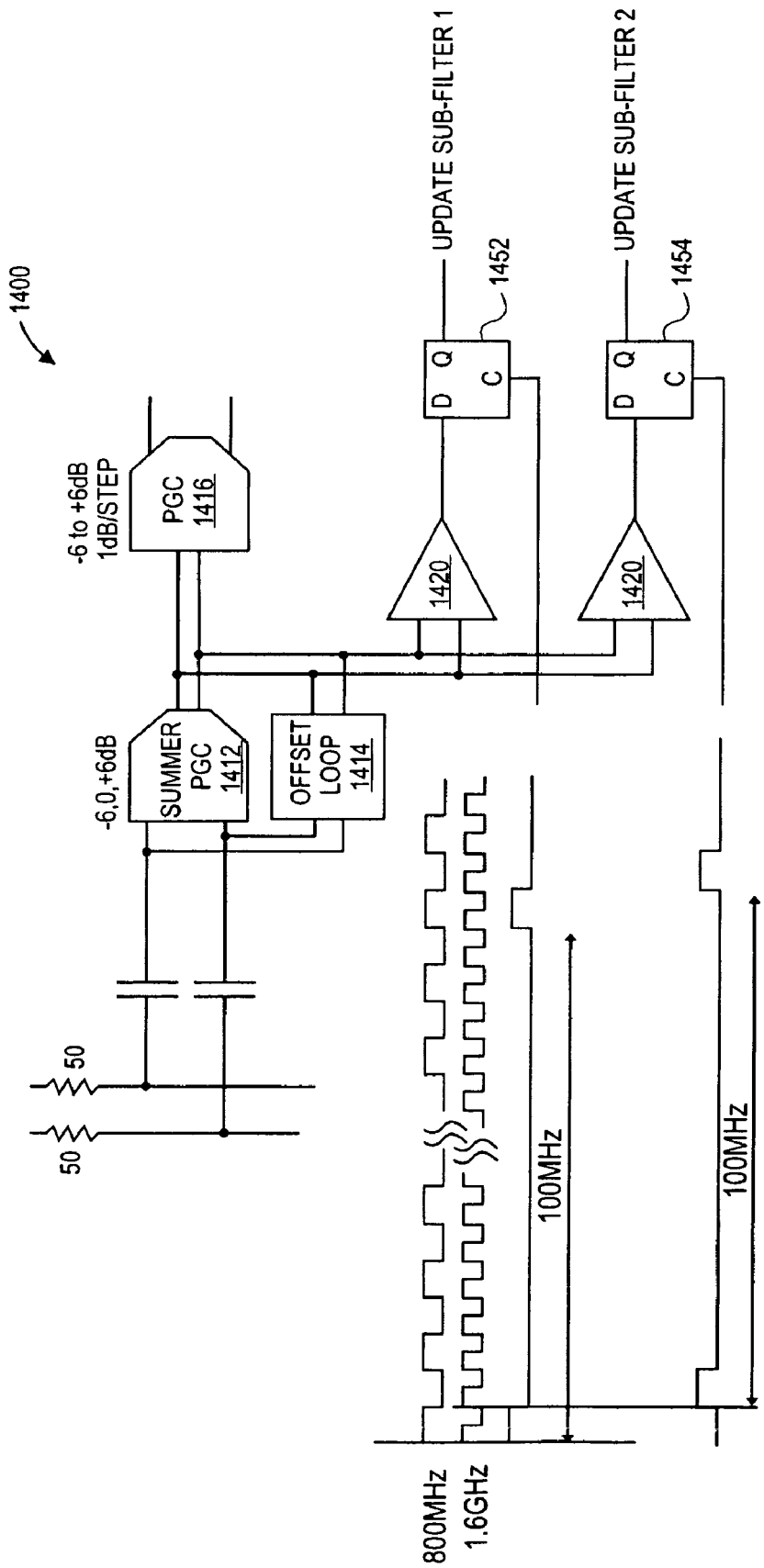
FIG. 14 illustrates an example clocking implementation for an echo canceling system in accordance with another embodiment.

FIG. 14 illustrates an alternative clocking implementation for an echo canceling system in accordance with another embodiment. The echo canceling system 1400 includes similar components compared to the system 1300, except the A/D converter 1350 is replaced with amplifiers 1420 and 1422. The system 1400 also includes a summer PGC 1412, a PGC 1416, an offset loop 1414, a latch 1452, and a latch 1454. The latches 1452 and 1454 are part of the LMS 1262 illustrated in FIG. 12. Each sub-filter in echo estimate 1266 is updated in accordance with the clocks of the latches 1452 and 1454. These latches both have a 100 MHz clocking frequency with a phase offset between the clocks of these latches. The digital echo canceller 1260 and transmit D/A converter 1208 both have a clocking frequency of 800 MHz while the D/A converter 1270 has a clocking frequency of 1.6 GHz.

Figure 15:
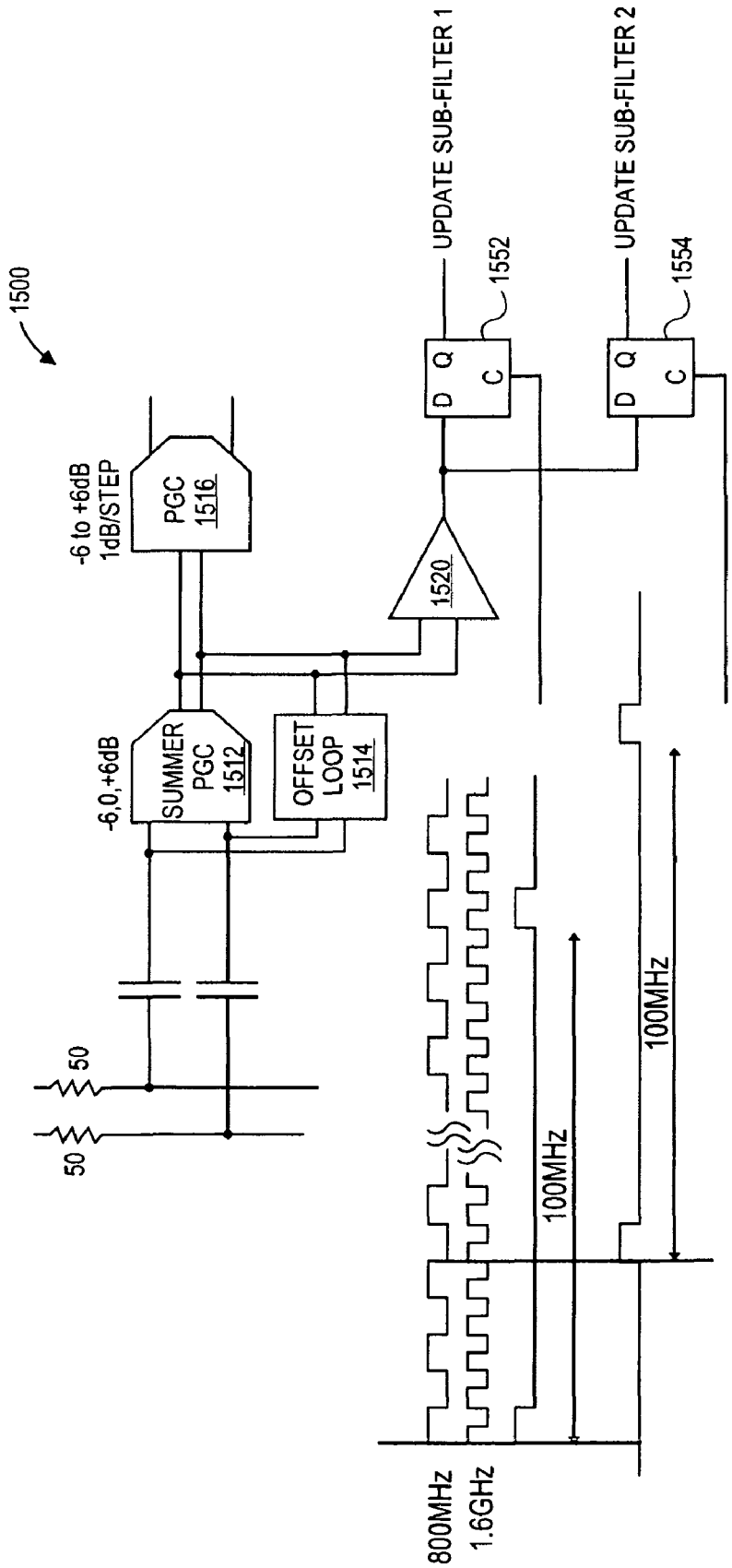
FIG. 15 illustrates an example clocking implementation for an echo canceling system in accordance with another embodiment.

FIG. 15 illustrates an alternative clocking implementation for an echo canceling system in accordance with another embodiment. The echo canceling system 1500 includes similar components compared to the system 1400, except the amplifiers 1420 and 1422 have been replaced with a single amplifier 1520. The system 1500 also includes a summer PGC 1512, a PGC 1516, an offset loop 1514, a latch 1552, and a latch 1554. The latches 1552 and 1554 are part of the LMS 1262 illustrated in FIG. 12. Each sub-filter in echo estimate 1266 is updated in accordance with the clocks of the latches. These latches both have a 100 MHz clocking frequency with a phase offset between the clocks of the latches. The digital echo canceller 1260 and transmit D/A converter 1208 both have a clocking frequency of 800 MHz while the D/A converter 1270 has a clocking frequency of 1.6 GHz.

FIG. 16 illustrates a poly phase implementation of a filter bank in accordance with one embodiment. The filter bank 1600 includes sub-filters 1610 and 1620, which operate in parallel. Each sub-filter estimates the echo in two different phases that are apart by one clock cycle (e.g., 1.6 GHz clock cycle). Each sub-filter can operate with a similar clocking frequency such as a 800 MHz clocking frequency. The coefficient update ($h_1$-$h_8$) needs two error signals 1630 and 1632 sampled at two different instances. For example, sub-filter 1610 has a sampling point 1 and sub-filter 1620 has a sampling point 2. In one embodiment, the sub-filters are not updated by consecutive error samples of error signals 1630 and 1632. Since the update frequency is low (e.g., 50 MHz, 100 MHz), one A/D converter can be shared to convert the two error samples as illustrated in FIGS. 12 and 13.

Thus, improved analog front end processing has been described for a data carrying signal received over a twisted pair or pairs. An adaptive echo canceller includes two adaptive filters that are independently trained by a single low resolution, low sampling rate ADC. These adaptive filters generate digital echo estimate signals with no analog or hybrid components. Also, adaptive filters can be trained to cancel echo signals up to 800 Mhz or higher. In general this concept may be extended to an analog echo canceller system with more than 2 filters in the filter bank by using an error A/D which samples the incoming signal at N (N>2) phases, using N filters generating N estimates of echo which are combined using a DAC running at N*Fs (N times Fs).

Although present embodiments have been described with reference to specific embodiments, it will be evident that various modifications and changes may be made to these embodiments without departing from the broader spirit and scope of the present embodiments. Accordingly, the specification and drawings are to be regarded in an illustrative rather than a restrictive sense

The invention claimed is:

1. A system, comprising a single error analog-to-digital converter (EADC) to generate a first error signal and a second error signal and to control a phase of each error signal, the first error signal having a different phase than the second error signal; a first adaptive filter unit to receive the first error signal and to generate a first digital echo estimate signal; a second adaptive filter unit to receive the second error signal and to generate a second digital echo estimate signal, the first and second error signals to independently train the first and second adaptive filter units, respectively; and a digital-to-analog converter (DAC), coupled to the first and second adaptive filter units, the DAC to generate an analog echo estimate signal based on the first and second digital echo estimate signals with the analog echo estimate signal being used in an analog domain to reduce an echo signal of an incoming signal.

2. The system of claim 1, further comprising a multiplexer coupled to the first and second adaptive filter units, the multiplexer to receive the first and second digital echo estimate signals each having a first clocking frequency and combine these signals into a third digital echo estimate signal having a second clocking frequency, which is twice the first clocking frequency.

3. The system of claim 2, wherein the digital-to-analog converter (DAC) is coupled to the multiplexer, the DAC to receive the third digital echo estimate signal from an output of the multiplexer and to generate the analog echo estimate signal.

4. The system of claim 3, further comprising a subtractor unit, coupled to the DAC, to add the analog echo estimate signal to the incoming signal having the echo signal, the subtractor unit to generate an analog signal with a reduced echo signal up to twice the first clocking frequency.

5. The system of claim 4, further comprising a second analog to digital (A/D) converter, coupled to the subtractor unit, to receive the reduced analog signal from the subtractor unit and to generate a digital signal for the rest of the receiver.

6. The system of claim 2, wherein the first and second adaptive filter units operate at the first clocking frequency.

7. The system of claim 3, wherein the DAC operates at the second clocking frequency which is twice the first clocking frequency.

8. The system of claim 1, wherein the EDAC operates at a third clocking frequency, which is significantly lower than the first clocking frequency.

9. The system of claim 8, further comprising one or more additional adaptive filter units, which in combination with the first and second adaptive filter units form at least three adaptive filter units, wherein the EDAC to generate at least three error signals with each one of the at least three error signals having a different phase.

10. The system of claim 9, wherein each of the at least three adaptive filter units to receive one of the at least three error signals and to generate one digital echo estimate signal, the at least three error signals to independently train the at least three adaptive filter units, respectively.

11. The system of claim 10, wherein the multiplexer is coupled to the at least three adaptive filter units, the multiplexer to receive at least three digital echo estimate signals each having the first clocking frequency and combine these signals into a fourth digital echo estimate signal having a fourth clocking frequency, which is at least three times the first clocking frequency.

12. The system of claim 8, wherein the third clocking frequency of the EADC is one hundredth of the first clocking frequency.

13. The system of claim 1, further comprising:
a first least mean square (LMS) unit, coupled to the EADC, to receive the first error signal and to generate a first set of tap coefficients that are sent to the first adaptive filter unit; and a second least mean square (LMS) unit, coupled to the EADC, to receive the second error signal and to generate a second set of tap coefficients that are sent to the second adaptive filter unit.

14. A method, comprising generating a first error signal and a second error signal having different phases with a single error analog-to-digital converter (EADC) that controls the phase of each error signal; generating a first digital echo estimate signal based on receiving the first error signal; generating a second digital echo estimate signal based on receiving the second error signal; independently training a first adaptive filter unit and a second adaptive filter unit with the first and second error signals, respectively; generating, with a digital-to-analog converter (DAC), an analog echo estimate signal based on the first and second digital echo estimate signals; and reducing, in an analog domain, an echo signal of an incoming signal using the analog echo estimate signal.

15. The method of claim 14, further comprising receiving the first and second digital echo estimate signals each having a first clocking frequency;
combining these signals into a third digital echo estimate signal having a second clocking frequency.

16. The method of claim 15, further comprising:
receiving the third digital echo estimate signal; and generating the analog echo estimate signal.

17. A method, comprising generating a first error signal and a second error signal having different phases with a single error analog-to-digital converter (EADC) that controls the phase of each error signal; generating a first digital echo estimate signal based on receiving the first error signal; generating a second digital echo estimate signal based on receiving the second error signal; independently training a first adaptive filter unit and a second adaptive filter unit with the first and second error signals, respectively; generating with a digital-to-analog converter (DAC), an analog echo estimate signal based on the first and second digital echo estimate signals; reducing an echo signal in an analog domain with the analog echo estimate signal that is based on the first and second digital echo estimate signals; and generating an analog signal with a reduced echo signal up to a frequency 800 MHz.

18. An apparatus, comprising a single error analog-to-digital converter (EADC) to generate a first error signal and a second error signal, and to control a phase of each error signal; a first adaptive filter unit, coupled to the EADC, the first adaptive filter unit to receive the first error signal and to generate a first digital echo estimate signal; a second adaptive filter unit, coupled to the EADC, the second adaptive filter unit to receive the second error signal and to generate a second digital echo estimate signal; means for independently training the first adaptive filter unit and the second adaptive filter unit with the first and second error signals, respectively; means for generating an analog echo estimate signal based on the first and second digital echo estimate signals; and means for reducing, in an analog domain, an echo signal of an incoming signal using the analog echo estimate signal that is based on the first and second digital echo estimate signals.

19. The apparatus of claim 18, further comprising means for receiving the first and second digital echo estimate signals each having a first clocking frequency; means for combining these signals into a third digital echo estimate signal having a second clocking frequency.

20. The apparatus of claim 19, further comprising:
means for receiving the third digital echo estimate signal; and means for generating the analog echo estimate signal.

21. An apparatus, comprising a signal error analog-to-digital converter (EADC) to generate a first error signal and a second error signal and to control a phase of each error signal; a first adaptive filter unit, coupled to the EADC, the first adaptive filter unit to receive the first error signal and to generate a first digital echo estimate signal; a second adaptive filter unit, coupled to the EADC, the second adaptive filter unit to receive the second error signal and to generate a second digital echo estimate signal; means for independently training the first adaptive filter unit and the second adaptive filter unit with the first and second error signals, respectively; a digital-to-analog converter (DAC), coupled to the first and second adaptive filter units, the DAC to generate an analog echo estimate signal based on the first and second digital echo estimate signals; means for reducing an echo signal in an analog domain with the analog echo estimate signal that is based on the first and second digital echo estimate signals; and means for generating an analog signal with a reduced echo signal up to a frequency 800 MHz.

22. The apparatus of claim 21, wherein the frequency is 800 MHz.

23. The method of claim 17, wherein the frequency is 800 MHz.

* * * * *